No. 768,983. Patented August 30, 1904.

UNITED STATES PATENT OFFICE.

HERBERT L. DUNN, OF HOPEDALE, MASSACHUSETTS, ASSIGNOR TO DRAPER COMPANY, OF HOPEDALE, MASSACHUSETTS, A CORPORATION OF MAINE.

HEAT-RESISTING AND FIREPROOF CONCRETE COMPOSITION.

SPECIFICATION forming part of Letters Patent No. 768,983, dated August 30, 1904.

Application filed March 7, 1904. Serial No. 196,974. (No specimens.)

*To all whom it may concern:*

Be it known that I, HERBERT L. DUNN, a citizen of the United States, residing at Hopedale, in the county of Worcester and State of Massachusetts, have invented an Improvement in Heat-Resisting and Fireproof Concrete Compositions, of which the following description is a specification.

This invention has for its object the production of a durable cheap concrete composition having high heat-resisting and fireproof properties, suitable for various building and constructional uses.

The composition can be used for floors in foundries, forge-shops, or other places where hot metal is liable to come in contact with the floors, and it is also valuable, on account of the cheapness thereof and insensibility to the action of high temperatures, as a fireproofing material, especially in connection with reinforced concrete-steel building construction, in concrete buildings, and with hollow concrete building-stone.

My improved concrete composition is composed of cast-iron chips or turnings, sal-ammoniac, Portland cement, sand, and water, the ingredients being thoroughly mixed to form a coherent homogeneous mass which can be molded, pressed, or otherwise made into desired forms or shapes.

In preparing the composition I proceed as follows: Three barrels of cast-iron chips or turnings as they come from machine-shops are spread upon a mixing board or platform in a thin layer—say about an inch deep. One pint of sal-ammoniac is then sifted over the layer of chips, and the latter are thoroughly mixed together, after which one barrel of Portland cement, previously mixed dry with one barrel of clean sharp sand, is added to and thoroughly mixed with the chips. Then as much water as the mixture will take is added, and the whole is mixed well together to form a coherent homogeneous mass, which is molded or otherwise shaped, as desired, while in plastic condition.

In the course of my experiments I have found that annealed cast-iron chips give the best results, as they appear to be more susceptible to the chemical action due to treatment with the sal-ammoniac. The latter is used not only for its cementing value, but because it makes the composition capable of standing wide extremes and sudden changes of temperature without cracking or disintegration. It is well known that ordinary concrete will not stand hot iron when spilled thereon, as in a foundry, as it will lift and flake off like granite. Upon a gangway surfaced with about an inch of my improved concrete composition upon two inches of ordinary cement-concrete a quantity of molten iron was poured and then removed. Water was then suddenly applied to the heated portion of the concrete, which was so hot that the water boiled for several minutes, with no resultant injury whatever to the concrete. Cylindrical blocks of the concrete composition herein described were heated to a white heat and then plunged into water without any cracking, disintegration, or any apparent injury whatever.

So far as regards strength, my improved concrete composition appears to be equal to the best concrete.

From numerous tests and experiments which I have made the concrete composition has proved to be thoroughly efficient as a "veneering" or protective covering on exposed surfaces in concrete and steel construction work to protect the same from heat and as a protective covering around steel beams, girders, columns, and other structural work, as well as for floors in cases where resistance to heat is desired.

In using cast-iron chips it is to be presumed that the same are reasonably clean and free from oil and grease.

The proportions I have given for the different ingredients are such as I have found give highly-satisfactory results; but these proportions may be varied somewhat without departing from the spirit and scope of my invention.

Having described my invention, what I claim, and desire to secure by Letters Patent, is—

1. A heat-resisting, fireproof concrete composition composed of Portland cement, sand, a preponderance of cast-iron chips or turnings, and sal-ammoniac, mixed with water, in substantially the proportions specified.

2. A heat-resisting, fireproof concrete composition composed of Portland cement and sand dry-mixed together, and a preponderance of annealed cast-iron chips treated with sal-ammoniac, the whole being thoroughly combined and mixed together with water, in substantially the proportions specified.

3. The herein-described process of making a heat-resisting fireproof concrete, which consists in spreading three barrels of cast-iron chips in a thin layer, mixing therewith one pint of sal-ammoniac, mixing together one barrel each of Portland cement and sand, adding the same to the treated iron chips and thoroughly mixing, and adding water and mixing to form a coherent homogeneous mass.

In testimony whereof I have signed my name to this specification in the presence of two subscribing witnesses.

HERBERT L. DUNN.

Witnesses:
CLARE H. DRAPER,
GEORGE OTIS DRAPER.